United States Patent Office 3,079,227
Patented Feb. 26, 1963

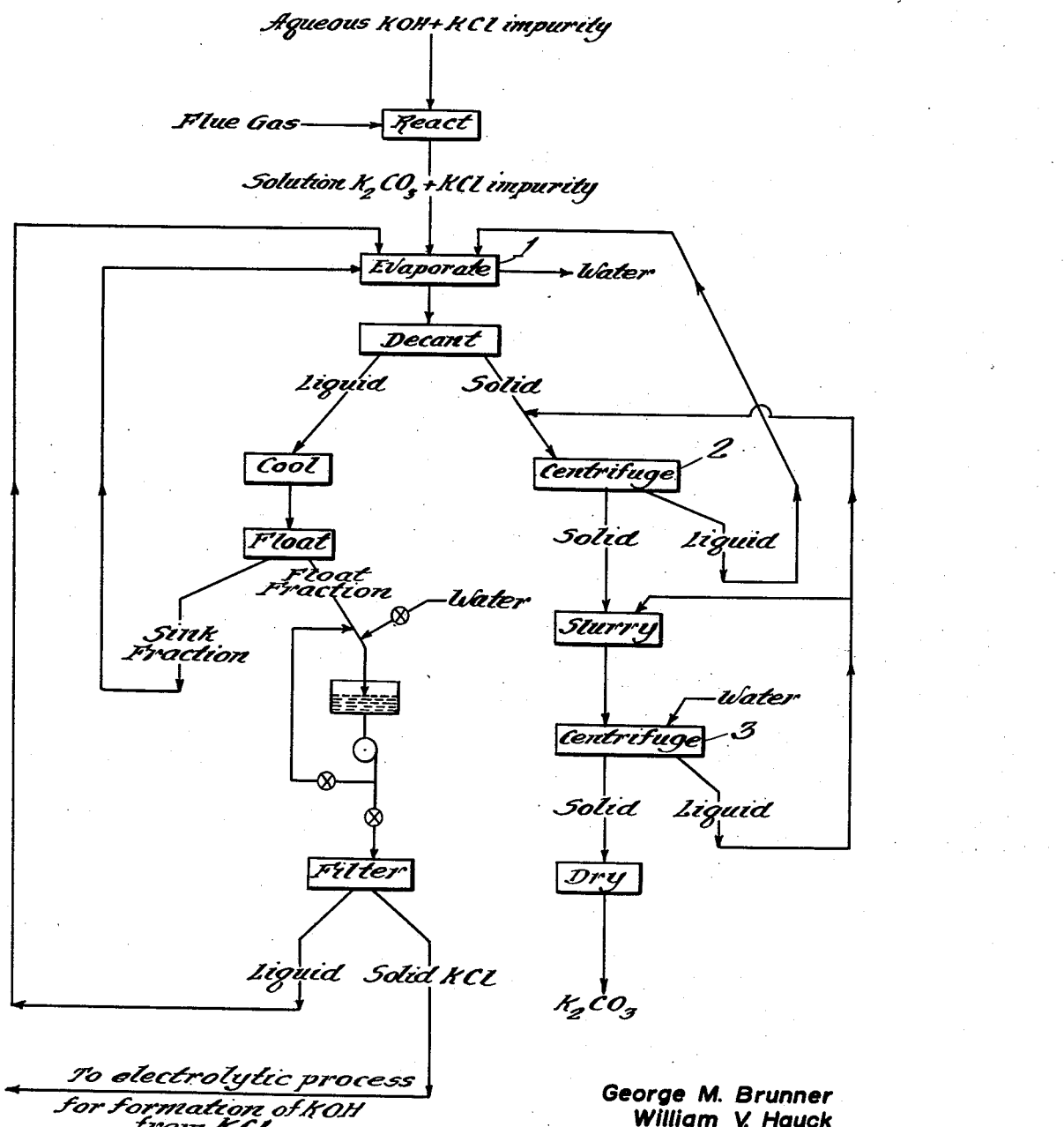

3,079,227
METHOD FOR THE PURIFICATION OF POTASSIUM CARBONATE
George M. Brunner and William V. Hauck, Niagara Falls, N.Y., and Albert Adams, Carlsbad, N. Mex., assignors to International Minerals & Chemical Corporation, a corporation of New York
Filed Mar. 19, 1959, Ser. No. 800,527
8 Claims. (Cl. 23—63)

The present invention relates to the purification of potassium carbonate. More particularly, it relates to the purification of potassium carbonate containing potassium chloride and other impurities.

One method for the production of potassium carbonate comprises electrolysis of aqueous potassium chloride solution to form potassium hydroxide containing a small proportion of potassium chloride, followed by carbonation of the aqueous potassium hydroxide solution, suitably with flue gas, to form potassium carbonate containing a small proportion of potassium chloride as the major impurity.

One method of purifying potassium carbonate containing potassium chloride as impurity is repeated crystallization of the salt from aqueous solution until the desired purity is attained. This can be achieved by dissolving the salt in hot water and recrystallizing by evaporation and/or cooling. Such a procedure not only results in poor yields of purified product, but is time-consuming and costly.

An object of the present invention is to provide an improved process for the purification of potassium carbonate.

Another object is to provide an integrated process for the purification of potassium carbonate wherein all materials used in the process are substantially completely recovered.

Another object is to provide an improved process for the separation of potassium chloride and other impurities from potassium carbonate produced from electrolytic potassium hydroxide, containing potassium chloride as impurity.

Other objects and advantages of the present invention will become apparent upon a fuller understanding of the invention as hereinafter set forth.

Generally speaking, the present invention effects purification of potassium carbonate by a technique which may involve (1) selective leaching with water under controlled conditions, (2) centrifugal washing of the solid phase, and (3) concentration of the leach liquor to effect crystallization, followed (4) by flotation of the resulting slurry and (5) appropriate recycle of the float and sink fractions.

The invention is applicable to the purification of potassium carbonate containing a small proportion of potassium chloride as impurity (e.g., up to about 5% by weight of the total solids, dry basis). The starting material is slurried in water (unless already existing in the form of a slurry) and is adjusted to an elevated temperature between about 60° C. and the boiling point, preferably between about 80 and about 100° C. The proportion of starting material to water should be sufficient to yield a slurry containing between about 30 and about 70% by weight of undissolved solids at equilibrium. The mixture is agitated, preferably until equilibrium has been approached or reached, and is then filtered, centrifuged, or decanted to separate the liquid and solid phases. The liquid phase is an aqueous solution substantially completely saturated with potassium carbonate and ordinarily at or near saturation with potassium chloride, while the solid phase is potassium carbonate containing potassium chloride in a proportion to potassium carbonate substantially lower than in the liquid phase.

Inasmuch as the solid phase occludes a quantity of the liquid phase, which contains a small proportion of dissolved potassium chloride, the solid phase may be further purified by selective leaching under controlled conditions. To carry out the leaching, the solid phase is first slurried in a wash medium, suitably water or preferably an aqueous solution saturated with essentially pure potassium carbonate. The proportion of undissolved solids to the wash medium should be sufficient to provide a slurry containing between about 20% and about 35% by weight of undissolved solids. The resulting slurry is centrifuged to separate the solid and liquid phases. The liquid phase, containing ordinarily up to about 90% or more of the potassium chloride occluded in the solid phase prior to the washing step, together with a high proportion of potassium carbonate, is recycled to the original aqueous slurry of impure potassium carbonate. The washed solid phase is a purified potassium carbonate product of reduced chloride content, ordinarily less than about 0.2% and in many cases less than about 0.1%.

Depending on the proportion of chloride as impurity contained in the original potassium carbonate and/or the desired purity of the final product, it may be advantageous to again subject the washed potassium carbonate to the selective leaching process generally according to the same procedure and under the same conditions as described hereinabove.

The liquid phase from the original aqueous slurry of impure potassium carbonate is substantially completely saturated with potassium carbonate and potassium chloride at the elevated temperature of separation from the solid phase. The potassium values therein can advantageously be recovered in the following manner. The liquid phase can optionally be evaporated to higher concentration if desired. It is then cooled to a temperature sufficiently low to produce crystallization of salts therefrom. For this purpose, the cooling is ordinarily carried to room temperature or somewhat below, the precise temperature being chosen to effect maximum crystallization of salts while avoiding production of a slurry which is too thick for further processing. By this means, a major proportion of the potassium chloride content of the liquor crystallizes in combination with a substantial proportion of potassium carbonate.

The resulting slurry is subjected to flotation in a conventional flotation cell, whereby the potassium chloride is selectively floated therefrom, preferably, without the use of a conditioning agent. If desired, a cationic flotation reagent such as a long-chain fatty acid amine (e.g., distilled octadecylamine acetate) may be employed; however, such reagents tend to cause foaming and dissolution of a portion of the solid potassium chloride, and their use is not generally preferred.

The float product is withdrawn, washed to remove potassium carbonate, and recycled for production of additional potassium hydroxide by electrolysis under conventional conditions. The sink fraction, containing a major proportion of the potassium carbonate originally present in the flotation mixture, is recycled to the original aqueous slurry of impure potassium carbonate.

For a better understanding of the present invention, reference may be had to the drawing which illustrates a preferred embodiment of the present invention.

In a preliminary operation, an aqueous solution of potassium chloride is electrolyzed to produce an aqueous solution of potassium hydroxide containing a small proportion of potassium chloride (ordinarily around 15% of the solution) as impurity. The resulting solution is concentrated by evaporation, preferably to about 45% potassium hydroxide by weight, whereby all but about 1% of the potassium chloride crystallizes. The potassium chloride crystals are separated from the solution by centrifugation. The liquid phase is treated with flue gas, comprised essentially of carbon dioxide, nitrogen, and water vapor, to convert the potassium hydroxide therein into potassium carbonate.

The resulting solution of potassium carbonate, containing less than about 1% potassium chloride, dry basis, is subjected to evaporation (designated for clarity as operation 1 in the drawing) to about 60% solids to cause the potassium carbonate to crystallize. The liquid phase, containing a higher proportion of potassium chloride to potassium carbonate than the solid phase, is separated from the slurry by decantation, leaving a solid phase comprised of potassium carbonate and to which is occluded as a liquid less than about 1% potassium chloride.

The solid phase potassium carbonate is further purified by slurrying in an aqueous solution substantially saturated with potassium carbonate; the resulting slurry preferably contains about 30% undissolved solids by weight. The slurry is subjected to centrifugation, 2, yielding a liquid phase containing about 90% of the potassium chloride originally contained in the slurry, and a solid phase comprised essentially of potassium carbonate containing less than about 0.1% potassium chloride, dry basis. The liquid phase is recycled to the evaporation step 1.

The solid phase is again slurried in an aqueous solution substantially saturated with essentially pure potassium carbonate. The resulting slurry is centrifuged, 3, separating the liquid phase, which is recycled to centrifuging 2. The solid phase, comprised essentially of potassium carbonate containing less than about 0.01% and generally less than about 0.005% potassium chloride, is dried to yield potassium carbonate of high purity.

The liquid phase decanted from the slurry of evaporation step 1 is cooled to about 15° C., during which cooling essentially all of the potassium chloride and some of the potassium carbonate crystallizes. The resulting slurry is subjected to a standard flotation in a Denver flotation cell, whereby the potassium chloride crystals are selectively floated from the potassium carbonate crystals. The sink fraction, comprising potassium carbonate of substantially reduced potassium chloride content, is recycled to the evaporation step, 1. The float fraction is transferred at intervals from the trough of the flotation cell to a container wherein the solids are allowed to settle out. The transfer of the first portion of the float product is effected with water, but the subsequent portions of the float product are transferred by recycling liquid phase from the earlier portions. When the float product liquid phase approaches saturation with potassium carbonate, the entire float product is withdrawn and filtered, thus effecting separation of the solid potassium chloride, which is recycled to the potassium hydroxide electrolytic process. The liquid phase, essentially saturated with potassium carbonate and containing less than about 1% potassium chloride, is recycled to the potassium carbonate evaporation step 1.

The present invention may be more fully understood from the following specific example, to be read in conjunction with the attached flowsheet, illustrating a continuous process designed to produce and purify 1450 pounds of potassium carbonate per hour.

*Example*

An aqueous 45% potassium hydroxide solution weighing 2600 pounds was treated with an excess of flue gas to produce 2890 pounds of a nearly saturated potassium carbonate solution containing approximately 1% potassium chloride as impurity. This solution was combined with recycle solutions, to be described hereinafter, of varying concentrations containing potassium carbonate and about 1% potassium chloride. The resulting mixture, totaling 10,915 pounds and containing 98 pounds potassium chloride, was evaporated at about 95° C., causing potassium carbonate to crystallize, until the solid phase constituted about 60% of the mixture. The liquid phase, 3200 pounds, containing 48 pounds of potassium chloride, was separated from the solid phase by decantation while still above 80° C., and was cooled to 15° C., whereby potassium chloride and a small proportion of potassium carbonate crystallized. The resulting slurry was subjected to a standard flotation operation in a Denver flotation cell. 41.6% of the potassium chloride present was selectively floated, whereas only 6.0% of the potassium carbonate floated.

Though the entire process was otherwise carried out on a continuous basis, treatment of the float fraction (200 pounds) was effected in a batch operation. The first float fraction was skimmed off and washed with 30 pounds of water down a chute into a receiving tank. A portion of the solid potassium carbonate present in the float fraction was dissolved in the water, thereby yielding a dilute solution of potassium carbonate as supernatant liquid in the receiving tank. This liquid was decanted and used to wash the next float fraction down the chute, thereby increasing the potassium carbonate concentration of the liquid phase in the receiving tank. This was continued until the liquid phase was nearly saturated with potassium carbonate. The mixture in the receiving tank was then filtered to separate the solid potassium chloride from the aqueous solution of potassium carbonate. The solid phase was recycled to electrolysis for potassium hydroxide formation. The liquid phase was recycled to the evaporation step 1.

From the decantation step, the slurry phase (5980 pounds) containing 4020 pounds $K_2CO_3$, 50 pounds KCl, and 1910 pounds of water was pumped to centrifuge 2 wherein the slurry was spun for 8 seconds, rinsed for 2 seconds with a recycle solution saturated with potassium carbonate, and spun again for 12 seconds. The solid, comprising potassium carbonate with 0.04% KCl, was unloaded with the aid of a recycle solution saturated with potassium carbonate to a slurry tank wherein the mixture was thoroughly agitated. The mixture was then pumped to centrifuge 3 wherein essentially the same procedure as described above was carried out. The purified solid potassium carbonate from centrifuge 3 was dried, yielding 1450 pounds of potassium carbonate containing 0.0034% potassium chloride.

While the invention has been described with reference to certain specific details, it is to be understood that such details are illustrative only, and are not intended to be limiting. Many adaptations and modifications of the invention will be apparent from the foregoing description to those skilled in the art.

The following claims particularly specify and distinctly claim the subject matter of the present invention:

1. An improved process for the purification of potassium carbonate containing potassium chloride as an impurity which comprises preparing a slurry (I) of said impure potassium carbonate in an aqueous medium selected from the group consisting of water and aqueous solutions of potassium carbonate, separating the liquid phase (II) from the solid phase (III) of said slurry (I) at a temperature above about 60° C., cooling said liquid phase (II) to a temperature sufficiently low to form a substantial amount of potassium chloride crystals and potassium carbonate crystals therefrom, subjecting the resultant slurry (IV) of potassium chloride and potassium carbonate to flotation, whereby potassium chloride is selectively floated therefrom, withdrawing the float product, recycling the flotation underflow to said slurry (I) of impure potassium carbonate in said aqueous medium, slurrying said solid phase (III) with an aqueous solution of essentially pure potassium carbonate, separating the resulting slurry (V) into a liquid phase and a solid phase (VI), said solid phase (VI) being purified potassium carbonate of reduced chloride content.

2. A process as in claim 1 wherein the liquid phase (II) is separated from the solid phase (III) of slurry (I) at a temperature above about 80° C.

3. A process as in claim 1 wherein said liquid phase (II) is cooled to about 15° C.

4. A process according to claim 1 wherein said solid phase (VI) is slurried with an aqueous solution of substantially pure potassium carbonate, and the resulting slurry is subjected to centrifugation to separate the liquid phase from the solid phase, said solid phase being purified potassium carbonate of less than about 0.01% chloride content.

5. In a process for the separation of finely divided, crystalline potassium chloride from admixture with finely divided, crystalline potassium carbonate in an aqueous medium saturated therewith, the improvement which comprises subjecting said mixture to flotation in the absence of a conditioning reagent, whereby said potassium chloride is selectively floated therefrom, and separating and withdrawing the float product.

6. In a process for the preparation of potassium carbonate, which process comprises passing flue gas through an aqueous solution of potassium hydroxide containing potassium chloride as an impurity, concentrating the resulting aqueous solution whereby potassium carbonate containing potassium chloride as an impurity is obtained as a solid phase (I) in aqueous slurry (II), the improvement which comprises segregating from said slurry (II), at an undissolved solids content greater than about 30% and at a temperature above about 60° C., said solid phase (I) and a liquid phase (III), cooling said liquid phase (III) to a temperature below about 30° C., thereby crystallizing a substantial proportion of the potassium chloride therein as potassium chloride crystals and a quantity of the potassium carbonate contained therein as potassium carbonate crystals, subjecting the resulting slurry (IV) to flotation, whereby potassium chloride is selectively floated therefrom, withdrawing the float product, recycling the flotation underflow to said slurry (II), slurrying said solid phase (I) with a substantially saturated aqueous solution of essentially pure potassium carbonate, centrifugally separating the resulting slurry (V) into a liquid phase (VI), recycling said liquid phase (VI) to said slurry (II), and a solid phase (VII), said solid phase (VII) being purified potassium carbonate of reduced chloride content.

7. A process as in claim 6 wherein the float product is collected and allowed to stratify, the liquid phase is decanted therefrom and used for transferring further quantities of said float product to the collection vessel, said decantation and transfer are continued until said liquid phase approaches saturation with potassium carbonate, the float product is then separated into a solid phase comprising largely potassium chloride and a liquid phase comprising potassium carbonate saturated with potassium chloride, and said liquid phase is recycled to the original aqueous slurry of impure potassium carbonate.

8. A process as in claim 6 wherein said purified potassium carbonate of reduced chloride content is slurried with an aqueous solution substantially saturated with essentially pure potassium carbonate, the resulting slurry is centrifugally separated into a liquid phase and a solid phase, said solid phase being purified potassium carbonate of less than about 0.005% chloride content.

References Cited in the file of this patent
UNITED STATES PATENTS

| | | |
|---|---|---|
| Re. 18,393 | Pike | Mar. 22, 1932 |
| 2,343,080 | Pike | Feb. 29, 1944 |
| 2,448,191 | Pike | Aug. 31, 1948 |
| 2,588,443 | Weinig | Mar. 11, 1952 |
| 2,699,377 | Dancy | Jan. 11, 1955 |
| 2,842,489 | Svanoe | July 8, 1958 |